United States Patent [19]

Starr, III et al.

[11] Patent Number: 5,305,238
[45] Date of Patent: Apr. 19, 1994

[54] DATA INPUT MONITOR AND INDICATOR FOR MANAGING WORK PACE AND REST PERIODS

[75] Inventors: Henry W. Starr, III, Coeur d'Alene, Id.; Norman V. Morse, Spokane, Wash.

[73] Assignee: Key Tronic Corporation, Spokane, Wash.

[21] Appl. No.: 971,393

[22] Filed: Nov. 3, 1992

[51] Int. Cl.$^5$ .................................................. B41J 29/00
[52] U.S. Cl. ............................. 364/569; 364/551.01; 395/926; 400/704
[58] Field of Search .................. 395/926; 400/704; 364/550, 551.01, 569

[56] References Cited

U.S. PATENT DOCUMENTS

| | | | |
|---|---|---|---|
| 1,411,579 | 4/1922 | Oswald | 235/102 |
| 2,044,201 | 6/1936 | Bliss | 235/102 |
| 3,270,438 | 9/1966 | Ephraim | 400/704 |
| 3,594,551 | 7/1971 | Strain et al. | 377/52 |
| 3,729,620 | 4/1973 | Jones | 377/30 |
| 4,143,808 | 3/1979 | Klavitter | 400/705 |
| 4,249,070 | 2/1981 | Miller | 377/52 |
| 4,824,269 | 4/1989 | Havel | 400/704 |
| 4,853,854 | 8/1989 | Behar et al. | 364/569 |
| 4,897,860 | 1/1990 | Lee et al. | 377/30 |
| 5,079,726 | 1/1992 | Keller | 364/551.01 |
| 5,109,350 | 4/1992 | Henwood et al. | 364/550 |

Primary Examiner—Jack B. Harvey
Assistant Examiner—Craig Steven Miller
Attorney, Agent, or Firm—Wells, St. John, Roberts, Gregory & Matkin

[57] ABSTRACT

A data input monitor for use with a data input device, such as a computer keyboard, measures the amount of data entered into a computer and establishes intermittent rest periods based on the measured data amount. The data input device includes a display for informing a user when to rest during the rest periods. The data input monitor includes in one embodiment a microprocessor programmed to count the number of keystrokes entered on the computer keyboard and to compute an actual input rate that data is entered into the computer. This actual input rate is then compared to a stored predefined input rate, and used to compute an actual rest period. The data input monitor uses LEDs to inform a user when to work and when to rest. A method for managing user work pace on a computer keyboard is also described.

51 Claims, 10 Drawing Sheets

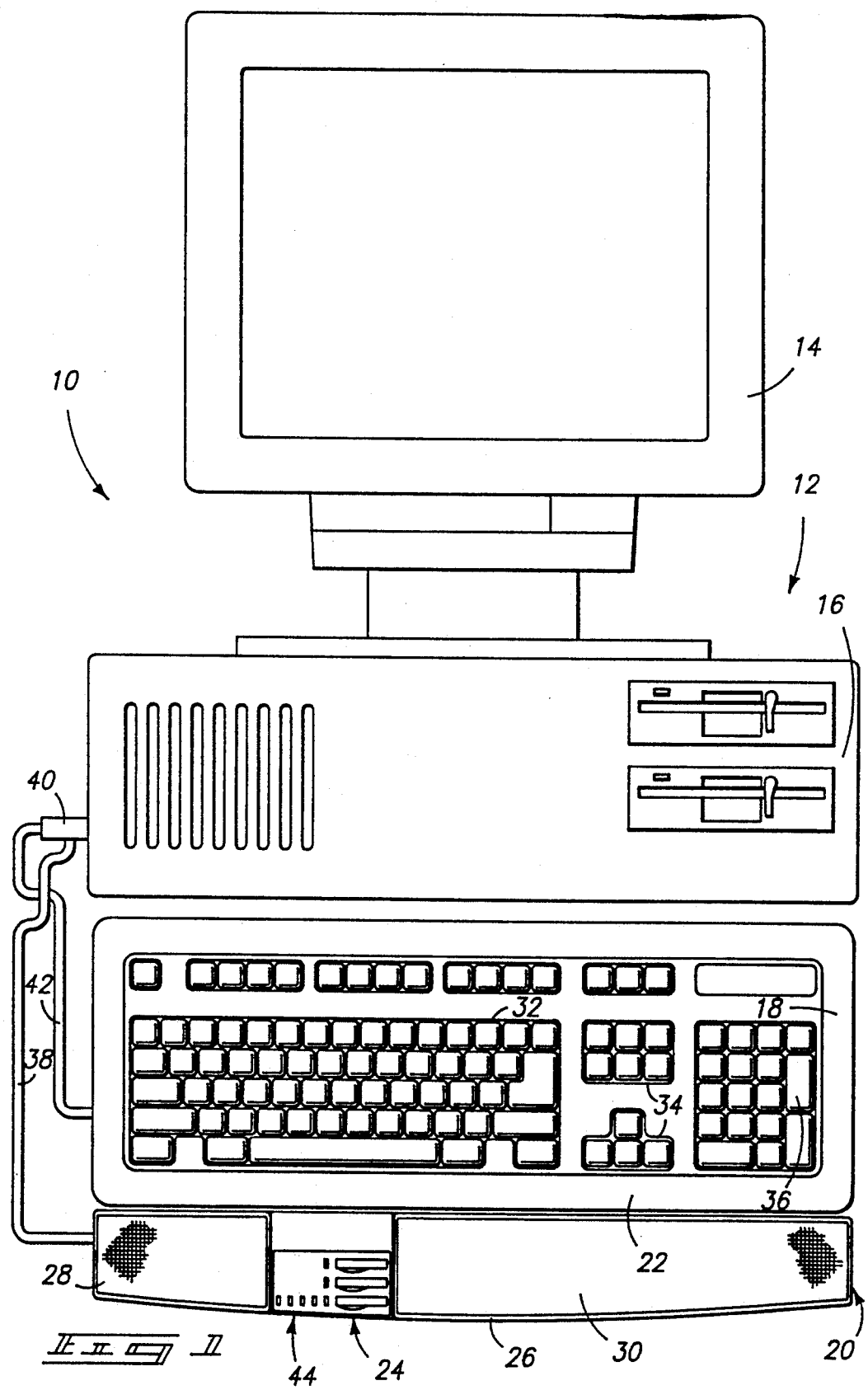

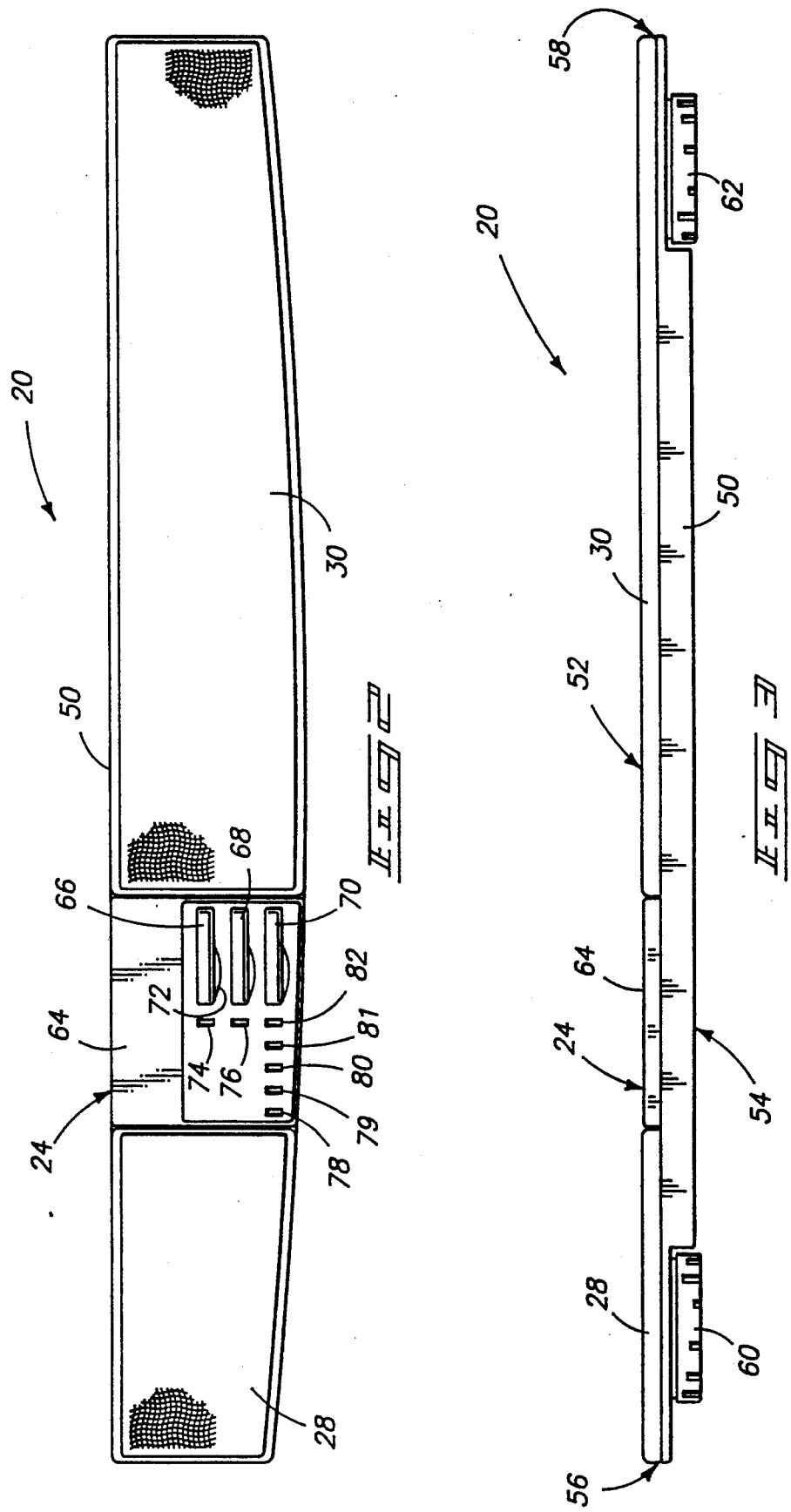

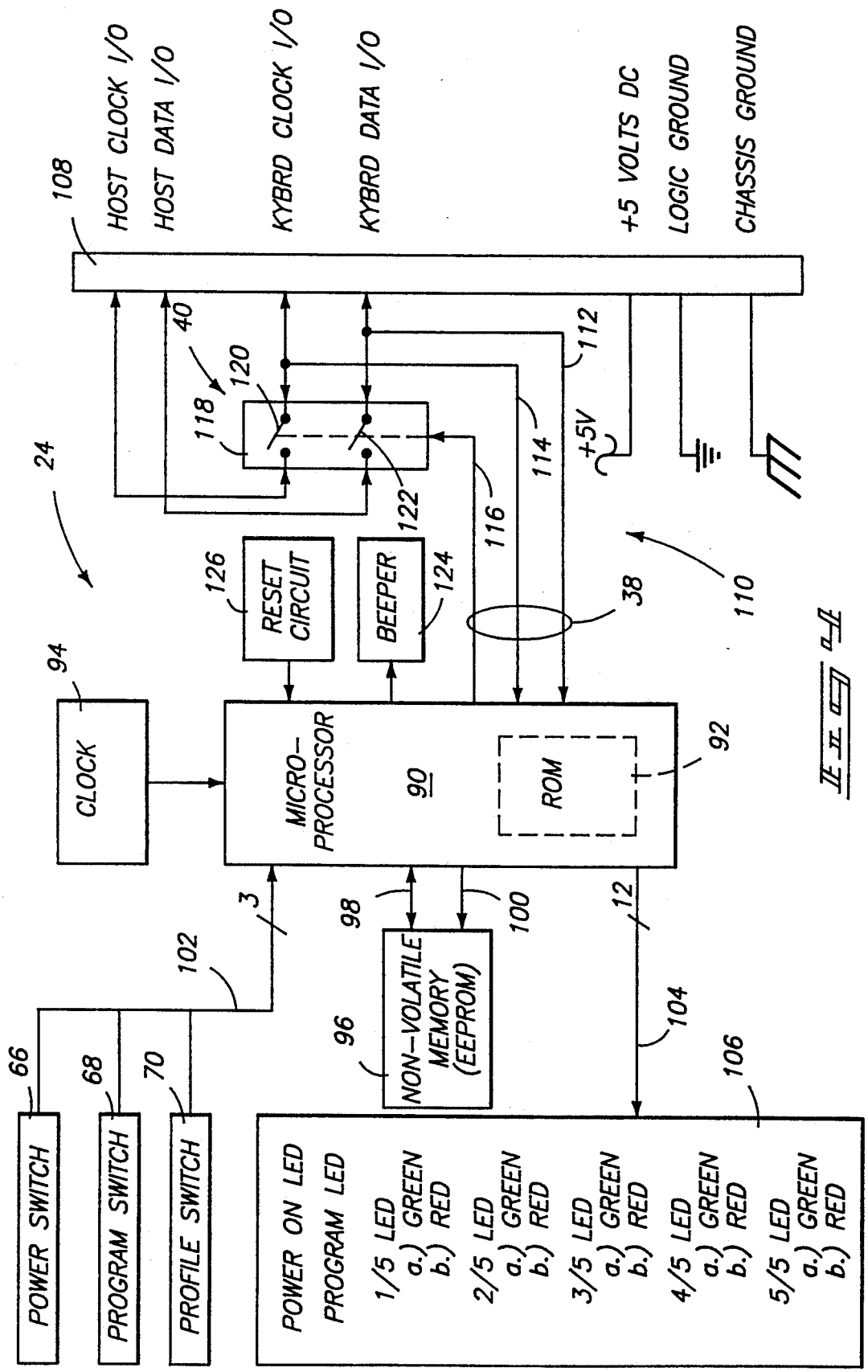

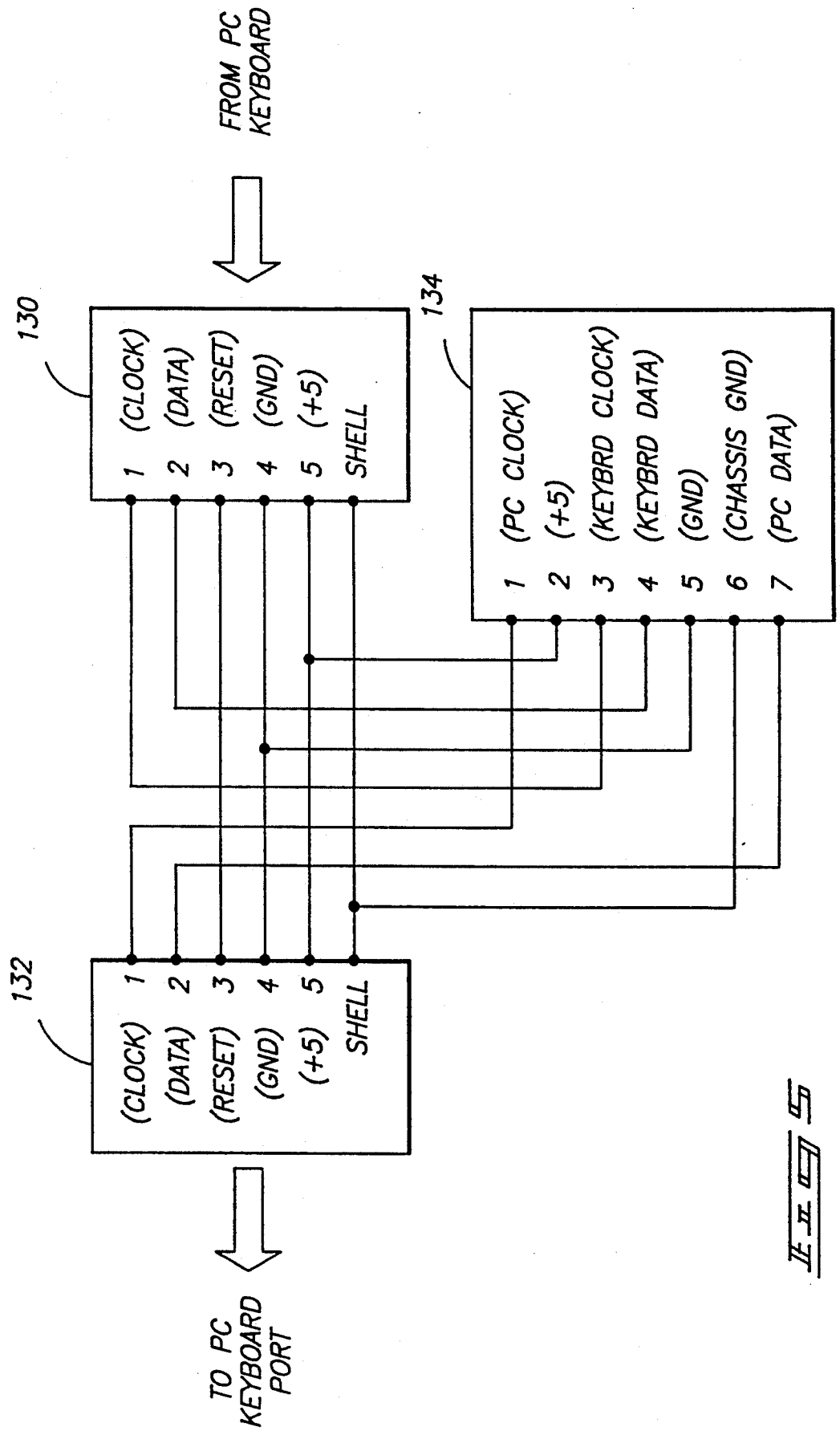

DATA INPUT MONITOR AND INDICATOR FOR MANAGING WORK PACE AND REST PERIODS

TECHNICAL FIELD

This invention relates to a data input monitor for use with a data input device that enters data into a computer. This invention also relates to computer keyboards and other computer peripheral units incorporating a data input monitor. This invention further relates to methods for managing a user's data entry work pace on a data input device.

BACKGROUND OF THE INVENTION

There is increasing awareness and concern in many industries concerning the ergonomics of consumer products. "Ergonomics" is an applied science concerned with the characteristics of people which must be considered in designing products and arranging things in order for people and products to interact most effectively and safely. In the data processing industry, product designers are concerned with manufacturing ergonomic monitors, keyboards, desks, and chairs to create a comfortable and safe environment for the user.

Recent studies indicate that data processing personnel can develop injuries from their job. Such injuries include tendinitis, muscle pulls, back injuries, eye strain, and carpal tunnel. These injuries are broadly classified as "repetitive stress injuries" or RSI.

To reduce repetitive stress injuries, manufacturers of computer products have designed ergonomic keyboards with special key contours and arrangements to facilitate natural movement and extension of a user's hands and forearms. Wrist supports can be provided on the keyboard or on a separate device designed to lie adjacent to the keyboard to promote proper hand placement. These manufacturers have also improved monitors to reduce glare and other problems which tend to induce fatigue and eye strain. Furniture manufacturers have developed special bi-level desks which support the computer on a first level and the keyboard on a second, lower level and special chairs with lower lumbar support to improve a computer user's posture and to promote comfort during long data processing sessions.

Although each of these improvements have been effective in reducing repetitive stress injuries, research indicates that human physiology differs widely over a broad spectrum of people. A particular movement or angle within a work environment may cause a repetitive stress injury to one user, but not to another user. Accordingly, it is difficult to design ergonomic products which are suitable to all users.

This invention provides a new system and technique for combating the repetitive stress injuries.

BRIEF DESCRIPTION OF THE DRAWINGS

Preferred embodiments of the invention are described below with reference to the following accompanying drawings.

FIG. 1 is a diagrammatic view of a computer peripheral unit according to one embodiment of this invention which is used to manage data entry from a computer keyboard to a computer.

FIG. 2 is a top plan view of the computer peripheral unit according to this invention.

FIG. 3 is a side elevation view of the computer peripheral unit.

FIG. 4 is a block diagram of a data input monitor according to one embodiment of this invention.

FIG. 5 is a block diagram illustrating an electrical interconnection of the computer peripheral unit between the computer keyboard and the data processing computer.

DETAILED DESCRIPTION OF THE PREFERRED EMBODIMENTS

Figure 6:
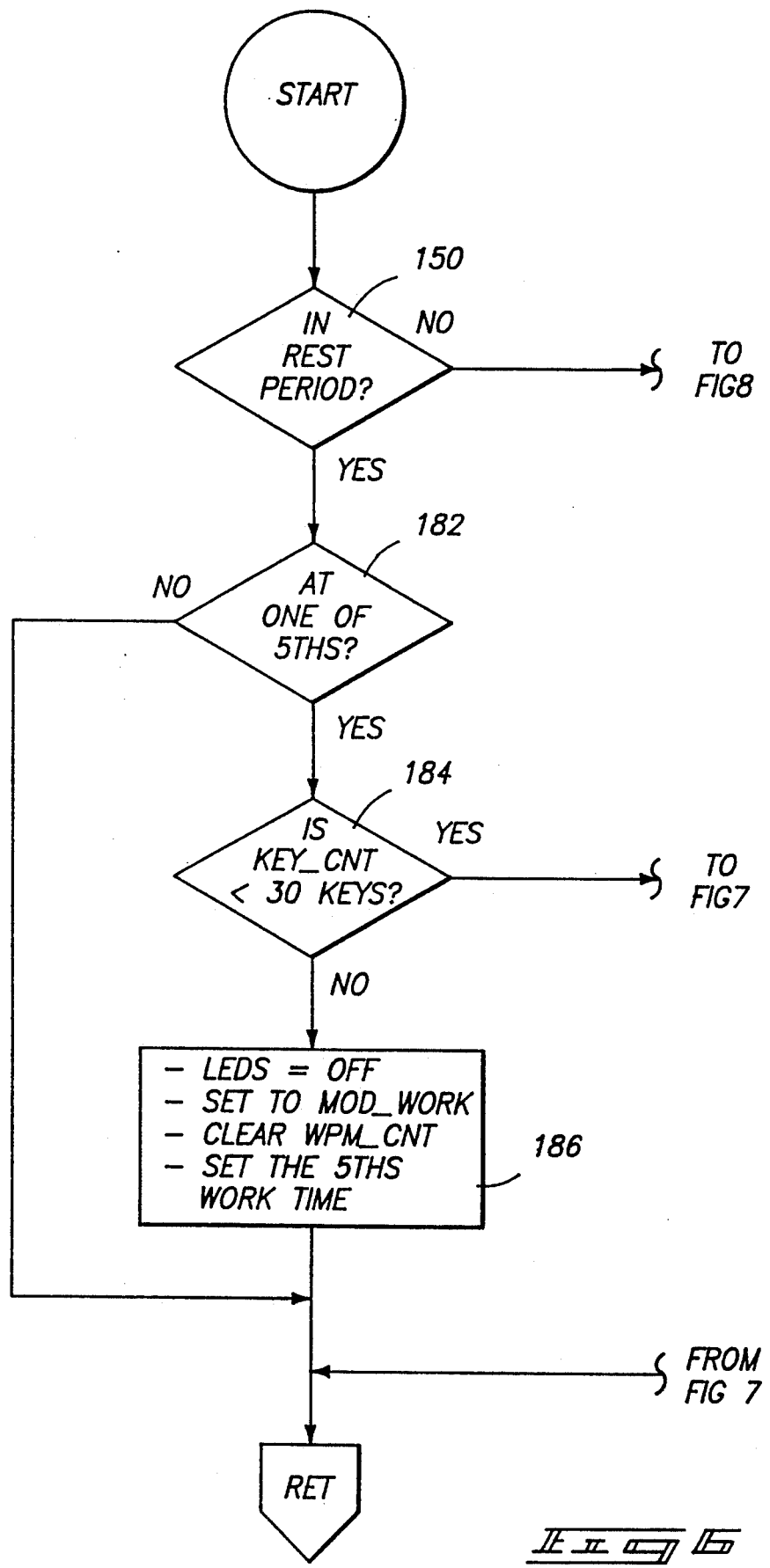
FIGS. 6-9 present a flow diagram illustrating a preferred operation of the data input monitor.

This disclosure of the invention is submitted in furtherance of the constitutional purposes of the U.S. Patent Laws "to promote the progress of science and useful arts" (Article 1, Section 8).

FIG. 1 illustrates a computer system 10 having a data processing computer 12 which consists of a monitor 14 and a CPU 16. Computer system 10 also has a computer keyboard 18 and a data input monitor/wrist support peripheral unit 20 which are electrically coupled to CPU 16. Monitor 14, CPU 16, and keyboard 18 are standard computer products which are well known in the art.

Peripheral unit 20 is a combination data input monitor 24 and wrist support structure 26. It is designed to be positioned along the front or proximal side 22 (relative to the user) of keyboard 18. Peripheral unit 20 props a keyboard user's hands at a selected vertical height to facilitate natural hand positioning for comfortable usage of keyboard 18. Wrist support structure 26 has a first padded region 28 provided at one end of the unit 20 and a second padded region 30 provided a second end of unit 20. The padded regions 28 and 30 are separated by data input monitor 24. Second padded region 30 is substantially larger in comparison to first padded region 28 because pad 30 extends relative to keyboard 18 to cover a greater portion of the keyboard, including the right-hand part of the QWERTY keys 32, the cursor and control keys 34, and the numeric adder pad keys 36. Padded region 28 is aligned adjacent to the left-hand portion of the QWERTY keys 32. Data input monitor 24 is centered beneath the QWERTY keys 32 of keyboard 18.

Peripheral unit 20 has an interface system which allows it to be electrically coupled between computer keyboard 18 and CPU 16. The interface system includes cable or bussing 38 and a Y-connector 40. Y-connector 40 has a male plug adapted for connection to a parallel port on CPU 16 and a female connector adapted to mate with a male connector provided on keyboard cable 42. Y-connector 40 allows data input monitor 24 to passively observe data entered from computer keyboard 18 to CPU 16 by transferring such data back to peripheral unit 20.

Data input monitor 24 monitors the data being transferred from keyboard 18 to CPU 16. The monitor can measure the total amount of data transferred over a given time frame, or compute an actual data input rate. One technique for monitoring the data is to count the number of keystrokes made by the user since such data is indicative of specific keys that are depressed by the user. Data input monitor 24 then establishes intermittent rest periods in accordance with the amount of data being entered into CPU 16. A series of light emitting diodes (LEDs) 44 are provided on data input monitor 24 to inform the user when to rest during the intermittent rest periods.

In this manner, data input monitor 24 of this invention provides a work pace manager which instructs the data processing operator to enter data during a work period and to rest during intermittent rest periods. Such rest periods or "micro-breaks" allow the user to stop repetitive data entry tasks in order to stretch, remove his/her hands from the keyboard, focus his/her eyes away from the monitor, and other relaxation techniques. Such micro-breaks effectively reduce repetitive stress injuries.

Additionally, the work pace monitor of this invention is effective for a wide range of people because it simply provides a series of rest periods. The human physiologies of users, although vastly different, are very receptive to short rest periods which provide user bodies time to heal, and thereby combat repetitive stress injuries.

FIGS. 2 and 3 illustrate data input monitor/wrist support peripheral unit 20 in more detail. It includes a wrist support structure having a body 50 with an upper side 52, a lower side 54, a first end 56, and a second end 58. Body 50 is preferably formed of molded plastic. A first padded region 28 is provided on upper side 52 at first end 56. A second padded region 30 is provided on upper side 52 and adjacent to second end 58. Padded regions 28 and 30 are preferably formed of soft foam or cushion which are covered by a piece of material such as fabric, leather, or synthetic.

The wrist support structure further includes a vertical adjustment system for raising and lowering body 50. This vertical adjustment system includes two adjustable platforms or feet 60 and 62 positioned at opposing first and second ends 56 and 58, respectively. Each foot is operatively mounted to lower side 54 of body 50 to provide different selectable vertical settings for peripheral unit 20. Preferably, adjustable feet 60 and 62 are of the type which adjust to discrete vertical settings upon rotation of each foot relative to body 50. For example, clockwise rotation of feet 60 and 62 raise the body 50 relative to a support surface (such as a table or desk), and counterclockwise rotation of feet 60 and 62 lower body 50 relative to a support surface.

Data input monitor 24 is mounted in body 50 of the wrist support structure. The data input monitor includes circuitry (not shown) housed within body 50, a top bezel or plate 64, three input keys or switches, and seven LED indicators. The three keys consist of a power on/off button or switch 66, a program switch 68, and a profile switch 70. These keys are formed flush with top bezel 64 (FIG. 3) to prevent a user from accidentally depressing one of the keys during data entry. Each key is provided with a quarter-spherical recess 72 which allows a user to depress the flush switch.

A power LED 74 is positioned adjacent to power key 66, and a program LED 76 is positioned adjacent to program key 68 (FIG. 2). LEDs 74 and 76 are preferably single-color LEDs, with the most preferred color being green. Five profile LEDs 78-82 are linearly arranged adjacent to profile key 70. LEDs 78-82 are preferably dual-color LEDs consisting of the colors red and green. These profile LEDs are also capable of emitting a third, amber color by alternating between the red and green color at a high rate.

Data input monitor 24 is also equipped with an audio emitting device, which is preferably in the form of a beeper (not shown), which releases individual sounds at a selected frequency and duration. The LEDs and/or beeper provide an informing means which instructs the user when to rest and when to enter data. The operation of the LEDs and beeper is discussed below in more detail.

FIG. 4 illustrates a preferred embodiment of the electronic circuitry of data input monitor 24. This circuitry is designed to measure the amount of data entered from a data input device (such as a keyboard or mouse) to a data processing computer. Where the data input device is a keyboard, for example, this can be done by counting the number of keystrokes entered on the computer keyboard. The circuitry or logic then sets intermittent rest periods depending upon the amount of data entered. Preferably, these rest periods are representative of a work pace in which the amount of data per predefined work period is considered in determining the duration of each rest period. The circuitry then controls LEDs 78-82 (FIG. 2) and the beeper to inform the operator to rest during the rest periods.

In the preferred embodiment, data input monitor 24 has a microprocessor 90 with on-chip ROM 92. A clock 94 is coupled to microprocessor 90. Preferably, clock 94 is a 3.58 MHz resonator. A separate non-volatile programmable memory 96 (preferably an EEPROM) is connected to microprocessor 90 via serial data line 98. A serial clock line 100 provides timing to EEPROM 96.

Power switch 66, program switch 68, and profile switch 70 are input via bus 102 to microprocessor 90. The microprocessor is also coupled via bus 104 to drive an LED bank 106 which consists of individual LEDs including power LED 74, program LED 76 and profile LEDs 78-82 (FIG. 2). Two separate signals are used to actuate the profile LEDs because these LEDs are dual-colored and therefore one signal controls the green filament and the other signal controls the red filament. Alternating these two signals at high speed creates an amber colored emission. Microprocessor 90 is also coupled to drive beeper 124.

Microprocessor 90 is coupled to PC host/keyboard connector 108 via an interface system 110. Connector 108 facilitates data transmission between the computer keyboard and the data processing computer. Connector 108 thereby interfaces the keyboard data I/O with the host data I/O, as well as the keyboard clock I/O with the host clock I/O.

Interface system 110 includes bussing 38 and Y-connector 40. Interface system 110 interconnects microprocessor 90 between the keyboard and computer to passively observe the data being entered from the keyboard to the computer. Bussing 38 includes a keyboard data input line 112, a keyboard clock input line 114 and a host enable control line 116. Y-connector 40 includes an analog switch IC 118 which is electrically coupled in line between the keyboard and the computer. Analog switch IC 118 is responsive to microprocessor 90 via host enable control line 116. Switches 120 and 122 are normally closed for normal data entry. Microprocessor 90 opens switches 120 and 122 only during a program mode so that the computer keyboard can be employed to program the data input monitor, as is discussed below. When switches 120 and 122 are open, data is transferred solely to microprocessor 90, and not to the host computer.

A reset circuit 126 is also provided to initiate microprocessor 90 in the event of a system failure.

FIG. 5 illustrates the interfacing among computer keyboard connector 130, computer connector 132, and data input monitor connector 134. The designated data output lines of connector 130 are coupled to a keyboard data port of data monitor connector 134. Similarly, the dedicated data port of computer connector 132 is coupled to a PC data port of monitor connector 134. In this manner, data transferred from the keyboard to the computer is passed through the data input monitor.

The operation of data input monitor 24 will now be generally described with reference to FIGS. 2 and 4. Data input monitor 24 is powered by the host computer. When the host computer is turned on, the data input monitor is also energized. The power on/off switch 66 does not actually affect the power to microprocessor 90, but instead alternately initiates or disengages microprocessor 90 from monitoring data entry from the keyboard to the computer. To a user, however, the power switch 66 appears to turn on and off the data input monitor.

When microprocessor 90 is energized and power switch 66 is "on", power LED 74 (FIG. 2) is illuminated. The data input monitor then preferably conducts a self-test. If this self-test fails, the power "on" LED 74 will begin flashing to indicate that there is an internal problem.

ROM 92 permanently stores one or more workpace profiles which consist of a predefined work period, a predefined rest period, and a predefined input rate for entering data into the computer during the predefined work period. Alternatively, these workpace profiles can be stored in EEPROM 96. Within each workpace profile, the predefined work period is the duration in minutes during which a user enters data into a data processing computer before a rest period is allotted. The predefined rest period is a predefined time period provided in seconds during which a user rests between sequential work periods. The predefined input rate is the rate at which the user enters data during the predefined work period and is kept in words per minute (WPM). In the preferred embodiment, seven keystrokes is equivalent to one word. Preferably, ROM 92 stores five predefined workpace profiles which are listed below:

| Workpace Profile 1 | |
| --- | --- |
| Predefined Work Period | 10 minutes |
| Predefined Input Rate | 40 WPM (400 words) |
| Predefined Rest Period | 30 seconds |
| Workpace Profile 2 | |
| Predefined Work Period | 15 minutes |
| Predefined Input Rate | 40 WPM (600 words) |
| Predefined Rest Period | 45 seconds |
| Workpace Profile 3 | |
| Predefined Work Period | 20 minutes |
| Predefined Input Rate | 40 WPM (800 words) |
| Predefined Rest Period | 60 seconds |
| Workpace Profile 4 | |
| Predefined Work Period | 30 minutes |
| Predefined Input Rate | 40 WPM (1200 words) |
| Predefined Rest Period | 90 seconds |
| Workpace Profile 5 | |
| Predefined Work Period | 45 minutes |
| Predefined Input Rate | 40 WPM (1800 words) |
| Predefined Rest Period | 135 seconds |

The user can select among these five workpace profiles by using profile switch 70. To visually indicate which profile the user is presently in, the five profile LEDs 78-82 are arranged to correspond to the five workpace profiles. Accordingly, LED 78 represents profile 1, LED 79 represents profile 2, and so on. By depressing profile key 70, a user can sequentially cycle through the workpace profiles. Additionally, a user can press the profile button 70 once anytime during data entry and microprocessor 90 will illuminate the corresponding profile LEDs 78-82 to indicate in which of the five predefined profiles the user is presently operating.

A user can also define his/her own workpace profile by programming the desired parameters into EEPROM 96. To program a user defined workpace profile, a user must first cycle through the workpace profiles by depressing the profile switch 70 to the preset workpace profile location. This is indicated by illuminating all five LEDs 78-82. The workpace profiles are sequenced via profile switch 70 in the following order: profile 1 (LED 78 is on; LEDs 79-82 are off), profile 2 (LED 79 is on; LEDs 78 and 80-82 are off), profile 3 (LED 80 is on; LEDs 78, 79, 81, and 82 are off), profile 4 (LED 81 is on; LEDs 78-80 and 82 are off), profile 5 (LED 82 is on; LEDs 78-81 are off), user defined profile (all five LEDs 78-82 are on), and then back to profile 1.

Next, the user depresses program switch 68 to initiate a programming routine within microprocessor 90. Once program switch 68 is actuated, program LED 76 is illuminated to green. The first profile LED 78 is then turned on to a flashing amber color. The other LEDs 79-82 remain off. The flashing amber LED indicates that the data input monitor is awaiting user input for the first parameter (i.e., the predefined work period). This parameter preferably has a three character field which allows a user to define a work period from 0-999 minutes, but preferably within the range of 0-600 minutes. Once the program routine is activated, microprocessor 90 commands analog switch IC 118 to open switches 120 and 122. As a result, the user can input the desired parameters into the workpace profile using the computer keyboard, without transferring this data to the host computer and thereby affecting computer operation.

Once the user has input a valid predefined work period, the first LED 78 will change to a solid green to indicate that a valid entry for that field has been entered. If the user does not input an appropriate value, the LED will change to a flashing red to indicate that the entry was invalid. When this occurs, the user must reenter a new value for the predefined work period whereby the LED returns to a flashing amber upon entry of the first keystroke.

Once a valid entry is made for the predefined work period, the second profile LED 79 begins flashing amber to indicate to the user that the next parameter (i.e., the predefined input rate) is ready for input. Again, this field contains three characters which permits a range from 0-999 WPM, but is preferably in the range of 0-256 WPM. Upon a valid entry, second profile LED 79 turns to solid green and third profile LED 80 begins flashing amber to tell the user to enter the third parameter (i.e., the predefined rest period). This third field also contains three characters which allows a range of 0-999 seconds.

Upon entry of valid data for the third field (i.e., the predefined rest period), microprocessor 90 turns off the first three LEDs 78-80, writes the new custom profile into EEPROM 96, and exits the programming subroutine. Microprocessor 90 also controls analog switch IC 118 to close switches 120 and 122.

Although the preferred embodiment is described as employing the computer keyboard to input the parameters for the user defined workpace profile, other initializing schemes can be employed. For example, during the programming phase, profile switch 70 may be used to cycle through preset values which can be selected as the parameters of a user defined profile. Alternatively, additional input switches may be added to data input monitor 24 for the purposes of programming a predefined work period, rest period, and input rate.

Although data input monitor 24 has been described as employing a ROM 92 and a EEPROM 96, other types of non-volatile memories may be used, including a PROM, EPROM, or battery backed RAM. It is most preferred that the data input monitor have both a permanent non-volatile memory for storing the predefined workpace profiles and a programmable non-volatile memory for storing the user defined workpace profile.

Data input monitor 24 begins normal operation any time the user begins keying data into the computer (assuming that power switch 66 is on). Microprocessor 90 monitors the data entry via data line 112 and measures the amount of data entered by the user during the predefined work period, such as by counting the number of keystrokes made by the user during the work session. The microprocessor next computes an actual input rate based upon the measured data amount or the number of keystrokes counted. Microprocessor 90 can then derive an actual rest period by adjusting the predefined rest period stored in either ROM 92 or EEPROM 96 in accordance with the relationship between the actual input rate that the user entered data and the predefined input rate of the workpace profile. By adjusting the predefined rest period based upon work performance to arrive at an actual rest period, work pace monitor 24 can award a longer rest period for those operators who entered more data during the work period than was required by the workpace profile, or decrease the period of rest for those operators who input less data than was required by the workpace profile.

Remember, one of the goals of the system is to provide adequate rest periods to help diminish repetitive stress injuries. Adjusting the rest period in accordance with the actual workpace is an effective technique for ensuring an appropriate rest period, without diminishing work efficiency. If an operator inputs a comparatively small amount of data, the operator only requires a small rest period. On the other hand, if the operator inputs a comparatively large amount of data, the operator requires a longer rest period.

Microprocessor 90 computes the actual rest period (ARP) according to the following equation:

$$ARP = (AIR/PIR) \times PRP$$

wherein AIR represents the actual input rate monitored by the microprocessor 90, PIR represents the predefined input rate stored in memory, and PRP represents the predefined rest period stored in memory. This equation increases the rest period when the operator works above the work load goal and decreases the actual rest period when the operator works below this goal. An example of this equation is provided below.

During the predefined work period, microprocessor 90 sequentially turns on the profile LED 78-82 (FIG. 2) in accordance with the percentage of work completed. In this embodiment, the predefined work period is apportioned into five equal time segments. One LED represents one time segment. The first LED 78 is illuminated when 1/5th of the work is completed. The second LED 79 is illuminated when 2/5ths of the work is completed. The remaining LEDs 80-82 are illuminated when 3/5ths, 4/5ths, and 5/5ths of the work are completed, respectively. Microprocessor 90 preferably has an internal clock which maintains a running time during the predefined work period so that the LEDs are illuminated in order as the time reaches the corresponding time segment.

The five profile LEDs 78-82 thereby inform a user as to what percentage of the work period has been completed, and how soon another rest period will occur. The first two LEDs 78 and 79 are preferably illuminated in a green color. The next two LEDs 80 and 81 (representing 3/5ths and 4/5ths of the work period completed) are preferably illuminated as an amber color. Once the predefined work period is completed, (i.e., at the 5/5ths mark), microprocessor 90 turns all five profile LEDs 78-82 red and activates beeper 124 to emit an audio warning. This combination of visual and audio indicators tell the user that he/she has reached the end of the predefined work period and that it is now time to rest. The color sequence of green-amber-red is selected to symbolize the well recognized traffic light system of green-yellow-red.

If the user does not stop and rest, data input monitor 24 will continue to warn the user that it is time to take a rest. It does this by causing all five profile LEDs 78-82 to flash red once the user has exceeded the end of the predefined work period by an additional 1/5th work slice (i.e., at 6/5ths of the predefined work period). Beeper 124 will emit two beeps at the 6/5ths mark and for each additional 1/5th work slice thereafter.

When the user decides to rest, data input monitor 24 recognizes the rest period by the inactivity of the keyboard and data transmission. Preferably, the computer input monitor 24 understands that the user is resting if it detects no keyboard activity for a ten second duration. This duration can be adjusted.

Once the user enters a rest period, microprocessor 90 extinguishes the profile LED 78-82 in a selected pattern according to the proportional amount of time remaining in the rest period. Accordingly, the right-most profile LED 82 (relative to the FIG. 2) is turned off when 1/5th of the rest period is completed, the fourth LED 81 is turned off when 2/5th of the work period is completed, and so on.

FIGS. 6-9 illustrate a flow chart of the general operation of the profile LEDs. This flow chart will be discussed with reference to an exemplary workpace profile. For purposes of further discussion, assume that the user has selected profile 1 in which the predefined work period is 10 minutes, the predefined rest period is 30 seconds, and the predefined input rate is 40 WPM (or a total of 400 words over the 10 minute work period). The predefined work period is separated into five equal time segments of two minutes apiece. The predefined work period commences when the user begins entering data.

Figure 8:
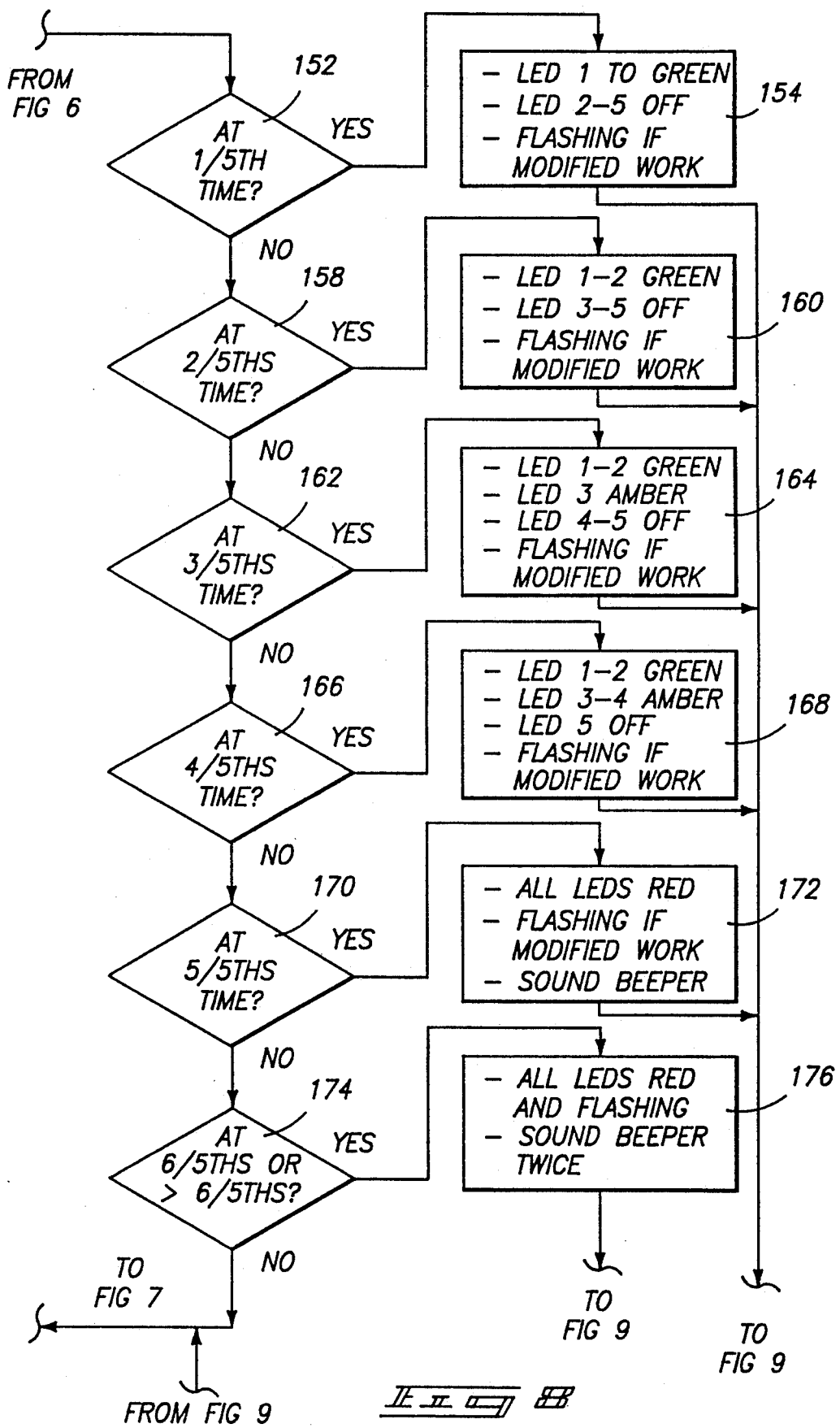
Figure 9:
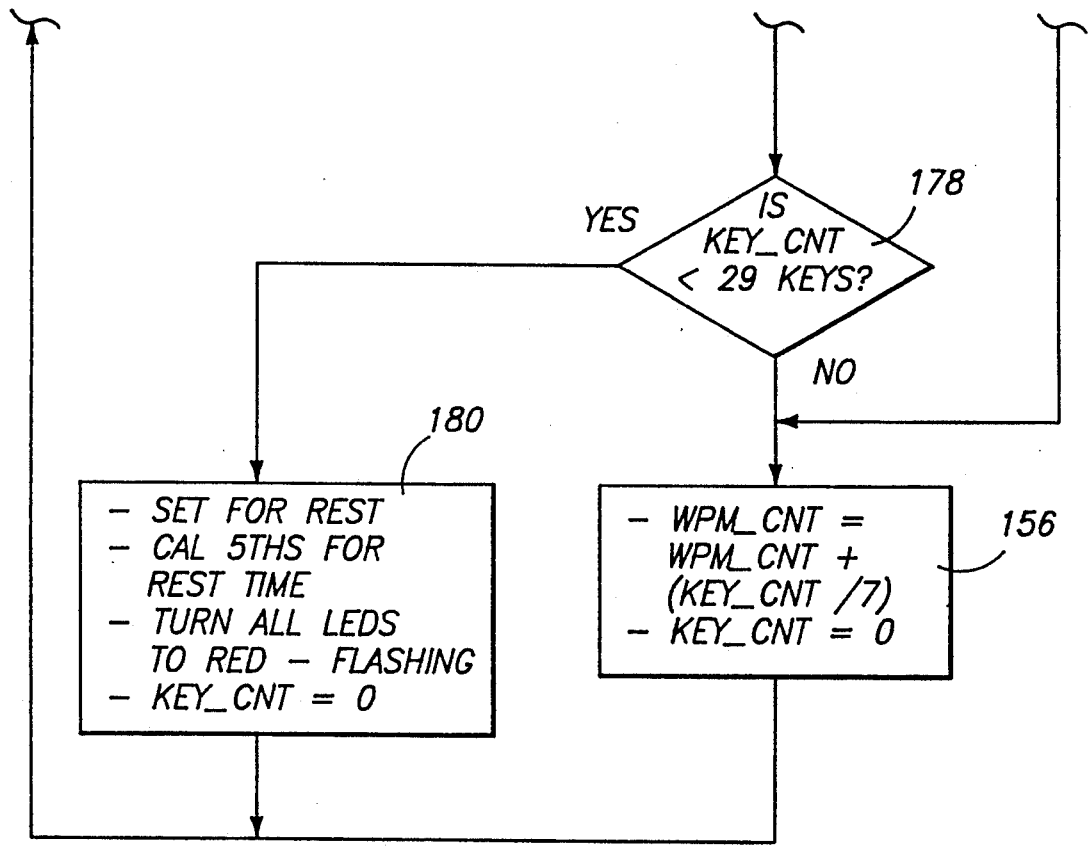

According to the flow diagram shown in FIG. 6, the first inquiry at step 150 is whether the user is currently in a rest period. Because the user is just beginning to input data during the predefined work period (i.e., the user is not in a rest period), the program branches to a series of decisions dealing with the work load phase, which is illustrated in FIG. 8. At step 152, the system checks to determine whether 1/5th (i.e., two minutes)

of the predefined work period has been completed. If it has, the first profile LED 78 is illuminated to green and the other profile LEDs 79-82 remain off (step 154). The word per minute count (WPM_CNT) is then updated at step 156 (FIG. 9) and flow is returned back to FIG. 6 where the cycle is repeated. Note that a word has been defined as seven keystrokes, and thus the updating of the word per minute count is equal to the previous word per minute count plus the key count divided by seven (i.e., WPM_CNT=WPM_CNT+(KEY_CNT/7)).

The routine is continually returned to the work decision path illustrated in FIG. 8 so long as the user continues working. At the four minute mark (2/5ths of the predefined work period—step 158), the first two profile LEDs are turned to green (step 160). At the six minute mark (3/5ths of the predefined work period—step 162), the first two LEDs 78 and 79 are green and the third profile LED 80 is turned on to an amber color (step 164). At the eight minute mark (4/5ths of the predefined work period—step 166), the first two LEDs are green and the next two LEDs are amber (step 168). Finally, at the ten minute mark (5/5ths of the predefined work period—step 170), all five LEDs are turned to red and the beeper is sounded (step 172).

If the user continues to work beyond the ten minute predefined work period, the system continues to check at each subsequent 1/5th work slice (step 174) whether or not the user has began resting. If the user has not rested by two minutes after the termination of the ten minute predefined work period, all five profile LEDs 78-82 become red and flashing and the beeper emits two beeps (step 176) to more strongly warn the user that he/she has overrun the predefined work period. The system continues to check if the user has taken the appropriate rest. This is done by examining whether the key count (KEY_CNT) is less than 29 keys (step 178 in FIG. 9). If the key count is 29 keys or greater, this indicates that the user has not taken a rest and thus the word per minute count (WPM_CNT) is updated (step 156) and flow continues as discussed above. However, if the key count is less than 29 keys, this indicates that the user is resting and thus, a rest period is set and the equal 1/5th time segments for that rest period are calculated (step 180).

Assume for continuing example that the operator's actual input rate equalled the predefined input rate of 40 WPM for a total of 400 words in the ten minute predefined work period. The operator is thereby entitled to an actual rest period which is equal to the predefined rest period of 30 seconds. During the rest period, the program branches from step 150 to step 182 (FIG. 6) to determine if the user is still within the actual rest period. If the rest period has elapsed, the program is exited. On the other hand, if the user is still within the actual rest period of 30 seconds, the system evaluates whether the key count is less than 30 keys (step 184). If the key count is less than 30 keys, this indicates that the user is resting and flow is continued to the decisional path illustrated in FIG. 7. On the other hand, if the key count is 30 keys or greater, this indicates that the operator is not resting and the system is set to the work load cycle (step 186).

Figure 7:
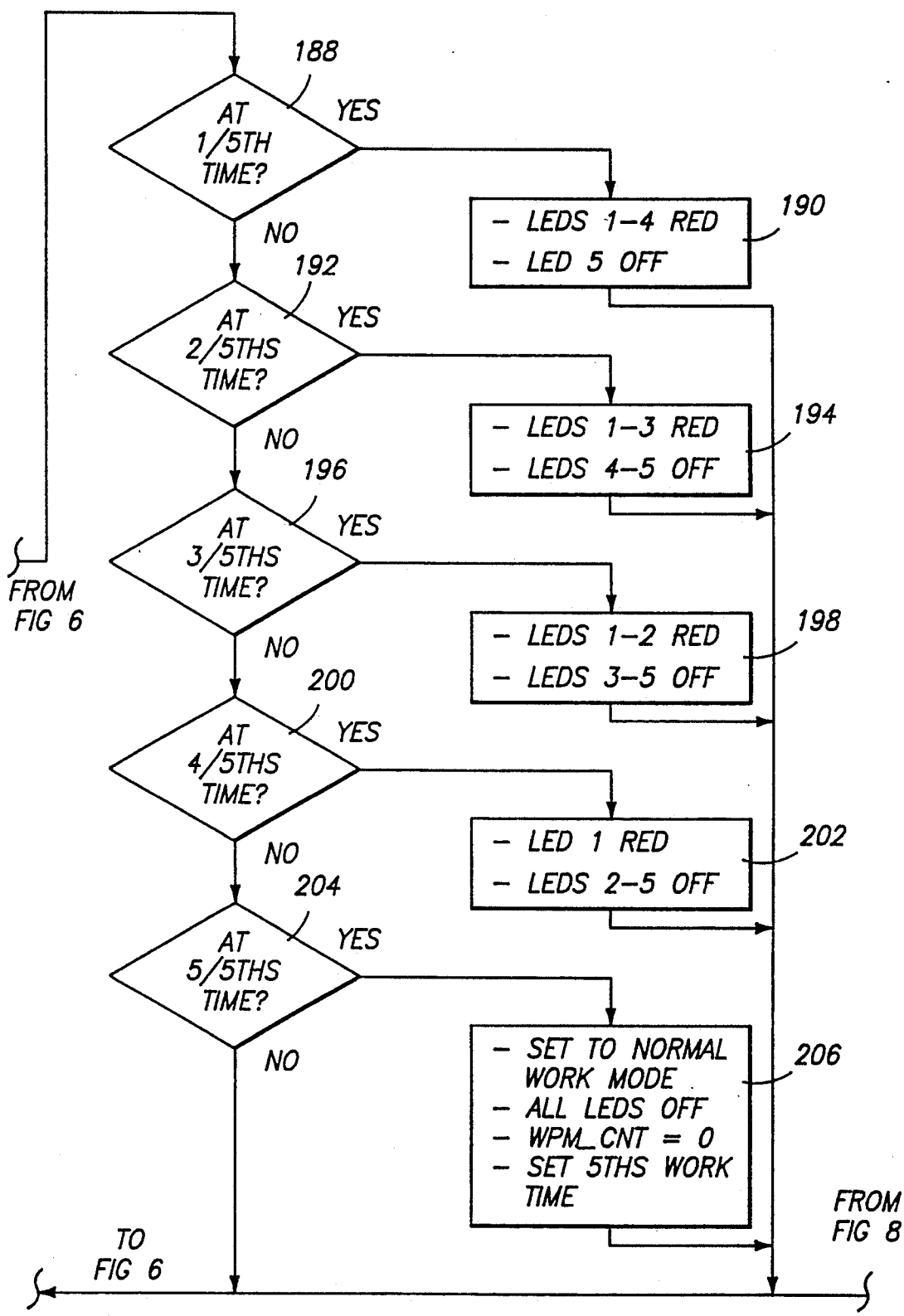

Since the actual rest period according to this example is 30 seconds, each LED will be extinguished at six second intervals (i.e., 30 sec÷5 time segments=6 sec/time segment). With reference to FIG. 7, flow begins at step 188 which checks to see if the first six seconds has elapsed. If it has, the right-most profile LED 82 (FIG. 2) is extinguished while the other four LEDs remain illuminated (step 190). At twelve seconds (step 192), the two right-most LEDs 81 and 82 (FIG. 2) are extinguished (step 194). At eighteen seconds (step 196), LEDs 80-82 are extinguished. At twenty-four seconds (step 200), LEDs 79-82 are turned off (step 202). At 30 seconds (step 204), all LEDs are turned off, the WPM count is initialized, the equal time segments for the work period are computed, and the operation is returned to the work mode (step 206).

According to this flow diagram, the LEDs are sequentially illuminated during the predefined work period to inform the user how much of the work period has been completed. The LEDs are then extinguished in sequential order during the actual rest period to inform the user of how much of the rest period remains.

The data input monitor of this invention is capable of adapting to different working scenarios, including the cases in which the user neglects to rest, or uses only a portion of the entire rest period, or works under the predefined input rate, or over the predefined input rate. A few of these situations are discussed below to demonstrate the versatility of the present invention.

When a user works at a higher or lower rate than the predefined input rate of the selected workpace profile, the data input monitor adjusts the actual rest period in accordance with the relationship between the actual input rate and the predefined input rate. This relationship was defined above by the equation ARP=(AIR/PIR)×PRP, where ARP represents the actual rest period, AIR represents the actual input rate, PIR represents the predefined input rate, and PRP represents the predefined rest period.

Continuing the above example using workpace profile 1, assume that the user enters data at an actual input rate of 10 WPM (i.e., AIR=10 WPM) for a total of 100 words during the ten minute work period. This is well below the predefined input rate (PIR) of 40 WPM (400 word). The data input monitor would adjust the predefined rest period (PRP) of 30 seconds to an actual rest period (ARP) of 7.5 seconds according to the above equation (i.e. 10 WPM/40 WPM×30 sec=7.5 sec). In this scenario, the profile LEDs would be turned off every 1.25 seconds which is 1/5th of the actual rest period of 7.5 seconds. On the other hand, if the user entered data at a rate of 60 WPM for a total of 600 words during the predefined work period (well above the predefined input rate), the predefined input rate of 30 seconds would be increased to an actual rest period of 45 seconds (i.e. 60 WPM/40 WPM×30 sec=45 sec). The profile LEDs would be extinguished every nine seconds which is 1/5th of the actual rest period of 45 seconds.

In the case where a full rest period is not taken, the unused percentage of the rest period will be calculated as equivalent words typed and added to the word count for the next work period. For example, if the operator only uses 50% of the 30 second rest period (i.e. 15 seconds) and the previous workpace profile required a total of 400 words, 200 words would be added to the word count accumulated for the next profile. That is, the rest period for the next work period will be increased with these "carryover" words.

Additionally, when the operator does not use the entire rest period, the profile LEDs 78-82 will operate in a flashing mode to inform the user that a portion of the rest period still remains. Accordingly, if the operator only uses 15 seconds of his/her total 30 second rest period, and then begins entering data for the subsequent work period, the first LED 78 will be illuminated as a flashing green light at the 1/5th time segment (i.e., the two minute mark). At the four minute mark, the second LED will begin flashing green. At the six minute mark, the third LED 80 will begin flashing amber, and so on. The LEDs will continue to flash until the operator rests for the full calculated rest period.

The preferred embodiment has been described as using a microprocessor 90. However, other monitoring and processing means may be employed in this invention. For example, a counter may be used to count the number of keystrokes made by the user on the computer keyboard during a work period. An arithmetic logic circuitry could be employed to compute a series of intermittent rest periods based upon the number of keystrokes counted by the counter. Additionally, other forms of integrated chips, such as microcontrollers and application specific integrated circuits (ASICs) may also be used in place of microprocessor 90.

This invention has been described as employing a plurality of single color and dual-colored LEDs. In an alternative embodiment, liquid crystal displays (LCDs) can be substituted for the LEDs. The LCDs could numerically show the time elapsed during work and rest periods. Alternatively, the LCD may graphically depict symbols or charts which represent elapsed time. With additional software and circuitry, it may also be possible to display the information on the computer monitor 14 (FIG. 1) as opposed to providing a display on the wrist support peripheral unit 20.

Figure 10:
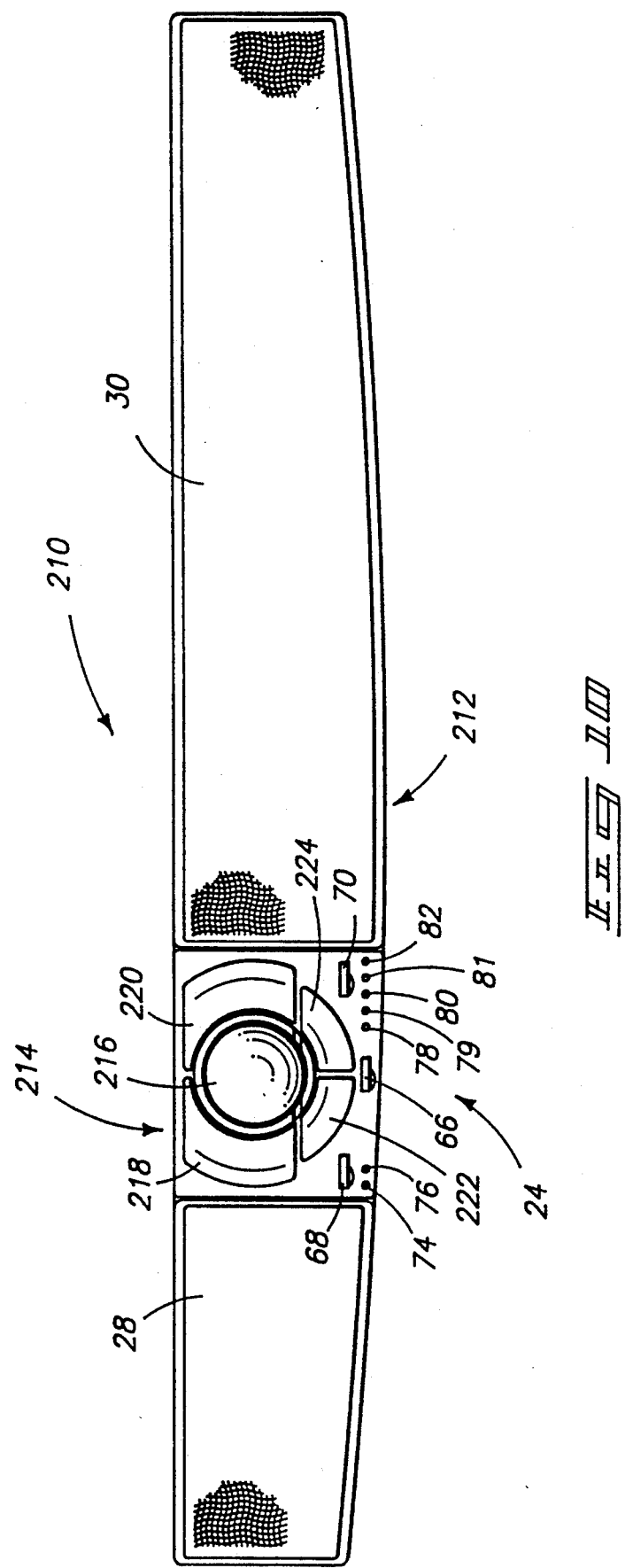
FIG. 10 is a top plan view of a computer peripheral unit according to a second embodiment of the invention.

FIG. 10 illustrates a peripheral unit 210 according to another embodiment of this invention. Peripheral unit 210 includes many of the same elements discussed above with reference to FIGS. 2 and 3. The same reference numerals are employed to represent like elements.

Peripheral unit 210 is substantially similar to peripheral unit 20 (FIGS. 2 and 3), but also includes a trackball assembly 214. Accordingly, peripheral unit 210 comprises a wrist support structure 212, a data input monitor 24, and a trackball assembly 214. The data input monitor and trackball assembly are arranged together within the same space between padded regions 28 and 30 as is occupied in the above embodiment by only the data input monitor. Trackball assembly 214 includes a trackball 216 which is rotatably mounted to permit a user to impart directional cursor information to the computer. Cursor operation is particularly useful in operating certain types of software and is well known in the art.

Surrounding track ball 216 is a left-hand clicker button 218, a right-hand clicker button 220, a drag lock button 222, and a speed change button 224. Trackball 216 is rotated to move the cursor across the screen to the desired location. Clicker buttons 218 and 220 are conventional and respond similar to push buttons for locking the cursor into a specific location or icon on the screen. Drag lock button 14 is utilized to lock onto an icon, or the like, and drag the icon over the screen to a new location based upon the movement of the cursor.

Speed change button 224 changes the ratio of the movement of the cursor over the screen in relation to the movement of the trackball 216. The speed mode is displayed by LEDs 78-82, which are shared by the data input monitor and the trackball assembly. Most trackballs are designed to have a resolution of approximately 200 counts per inch. This is a default position and is normally identified with one of the LEDs 78-82. When speed change button 224 is depressed, the system might electronically speed up or double the movement rate of the cursor in relationship to the trackball to increase the speed to 400 counts per inch. This will illuminate another one of the LEDs 78-82. When speed button 224 is pushed again, the rate might slow to only 50 dots per inch. Again, a different LED will be illuminated to represent that speed change. This embodiment of the trackball assembly accommodates five different and programmable speed changes.

Figure 11:
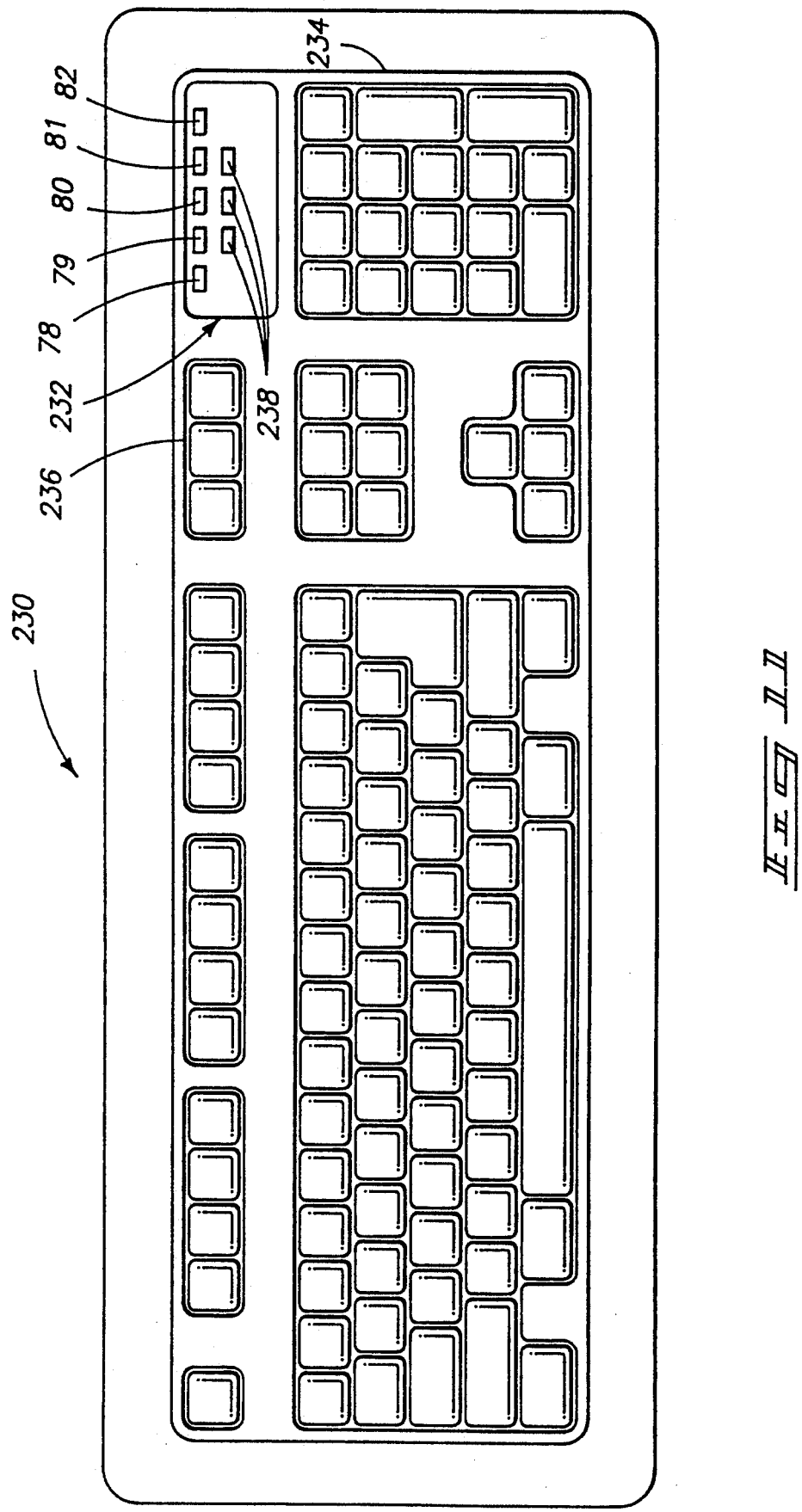
FIG. 11 is a top plan view of a computer keyboard which incorporates the data input monitor according to a third embodiment of this invention.

FIG. 11 illustrates a computer keyboard 230 which incorporates a data input monitor 232 of this invention. Data input monitor 232 is positioned above the numeric adder pad 234 and to the right of mode control keys 236. Data input monitor 232 includes the profile LEDs 78-82. The standard "num lock", "caps lock", and "scroll lock" LEDs 238 are also used to represent the power and program LEDs of the data input monitor. Data input monitor 232 operates in the same manner as discussed above with respect to early embodiments.

This invention also contemplates a method for managing user work pace on a data input device for entering data into a computer. According to this invention, the method comprises measuring an amount of data entered from the data input device into the computer. This can be accomplished by measuring an actual amount of data or measuring an actual input rate, such as by counting the number of keystrokes. The next step is to provide intermittent rest periods based upon the measured data amount. As discussed above, this can be accomplished by comparing the actual input rate to the predefined input rate and increasing or decreasing the predefined rest period depending upon the comparison to arrive at an actual rest period. The final step is to then inform the user to rest during the rest periods and to work during the work periods. This may be accomplished in the preferred embodiment by illuminating a plurality of LEDs in a selected pattern during the predefined work period and extinguishing the LEDs in a selected pattern during the actual rest period. Alternatively, an audio alert signal can be sounded after completion of the predefined work period to warn the user to begin resting.

This invention is suitable for a wide range of data processing tasks and can be interfaced with many existing data input devices, including IBM ®/PC-compatible computers, Apple ® Macintosh computers, and any other desktop computers. This invention may also be used with data entry or "dumb" terminals.

This invention is advantageous over previous approaches to providing an ergonomically desirable working environment. By providing a series of intermittent "micro-breaks" and warning the user to rest during these breaks, the data input monitor of this invention effectively reduces repetitive stress injuries. Allotting such "micro-breaks" is a convenient and easy way to disrupt repetitive tasks. This allows the data processing operator to move, stretch, or otherwise rest, which alleviates fatigue, drowsiness, and other inefficient conditions, in addition to reducing repetitive stress injuries.

In compliance with the statute, the invention has been described in language more or less specific as to structural and methodical features. It is to be understood, however, that the invention is not limited to the specific features described and shown, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A data input monitor for use with a data input device that enters data into a computer, the data input monitor comprising:
   monitoring means for measuring an amount of data entered from the data input device to the computer;
   determination means for establishing intermittent rest periods in accordance with the amount of data entered from the input device; and
   means for informing a user to rest during the rest periods.

2. A data input monitor according to claim 1, wherein the informing means comprises at least one of a visual display and an audio emitting device.

3. A data input monitor for use with a computer keyboard and computer, the data input monitor comprising:
   a counter for counting a number of keystrokes of the computer keyboard made by a user during a work period;
   arithmetic logic, coupled to the counter, to compute intermittent rest periods based upon the number of keystrokes counted; and
   a display, coupled to the arithmetic logic, to inform a user to rest during the rest periods.

4. A data input monitor for use with a data input device that enters data into a computer, the data input monitor comprising:
   memory means for storing a predefined work period, a predefined rest period, and a predefined input rate for entering data into the computer during the predefined work period;
   monitoring means for measuring an actual input rate of data entered from the data input device to the computer during the predefined work period;
   processing means, operatively coupled to the memory means and the monitoring means, for deriving an actual rest period by adjusting the predefined rest period in accordance with a relationship between the actual and predefined input rates; and
   informing means, coupled to the processing means, for indicating to a user to enter data during the predefined work period and to rest during the actual rest period.

5. A data input monitor according to claim 4, wherein the informing means comprises at least one of a visual display and an audio emitting device.

6. A data input monitor according to claim 4, wherein the informing means comprises a plurality of light emitting diodes (LEDs) which are illuminated in a selected pattern during the predefined work period and extinguished in a selected pattern during the actual rest period.

7. A data input monitor according to claim 4, wherein the informing means comprises an audio emitting device which emits sound upon termination of the predefined work period to warn a user to begin resting.

8. A data input monitor according to claim 4, wherein the processing means derives the actual rest period (ARP) as follows:

$$ARP = (AIR/PIR) \times PRP$$

wherein AIR represents the actual input rate, PIR represents the predefined input rate, and PRP represents the predefined rest period.

9. A data input monitor according to claim 4, wherein the predefined work period is apportioned into multiple time segments;
   the data input monitor further comprising:
   clock means for maintaining a time during the partial time segments of the predefined work period;
   and wherein the informing means comprises a plurality of light emitting diodes (LEDs) for corresponding time segments, one LED representing one time segment, the LEDs being illuminated in a selected pattern as the time kept by the clock means reaches the corresponding time segments.

10. A data input monitor according to claim 9, wherein the LEDs are dual colored.

11. A data input monitor according to claim 4, further comprising initializing means for setting the predefined work period, the predefined rest period, and the predefined input rate.

12. A data input monitor according to claim 4, wherein the memory means comprises:
    non-volatile memory for permanently storing a plurality of workpace profiles, individual workpace profiles including a predefined work period, a predefined rest period, and a predefined input rate; and
    a programmable memory for storing a user defined workpace profile including a predefined work period, a predefined rest period, and a predefined input rate.

13. A data input monitor according to claim 4, wherein the memory means, the monitoring means, the processing means, and the informing means are incorporated within a structure of a computer keyboard.

14. A data input monitor for use with a data input device that enters data into a computer, the data input monitor comprising:
    a microprocessor including memory to store a predefined work period, a predefined rest period, and a predefined input rate for entering data into the computer during the predefined work period, the microprocessor being programmed to (1) measure an amount of data entered from the data input device to the computer during the predefined work period, (2) compute an actual input rate based on the measured data amount, and (3) derive an actual rest period from the predefined rest period in accordance with a relationship between the actual and predefined input rates; and
    informing means, coupled to the microprocessor, for indicating to a user to enter data during the predefined work period and to rest during the actual rest period.

15. A data input monitor according to claim 14, wherein the informing means comprises at least one of a visual display and an audio emitting device.

16. A data input monitor according to claim 14, wherein the informing means comprises a plurality of light emitting diodes (LEDs) which are illuminated in a selected pattern during the predefined work period and extinguished in a selected pattern during the actual rest period.

17. A data input monitor according to claim 14, wherein the informing means comprises an audio emitting device which emits sound upon termination of the predefined work period to warn a user to begin resting.

18. A data input monitor according to claim 14, wherein the microprocessor derives the actual rest period (ARP) as follows:

$$ARP = (AIR/PIR) \times PRP$$

wherein AIR represents the actual input rate, PIR represents the predefined input rate, and PRP represents the predefined rest period.

19. A data input monitor according to claim 14, wherein the predefined work period is apportioned into multiple time segments;
the data input monitor further comprising:
clock means for maintaining a time during the partial time segments of the predefined work period;
and wherein the informing means comprises a plurality of light emitting diodes (LEDs) for corresponding time segments, one LED representing one time segment, the LEDs being illuminated in a selected pattern as the time kept by the clock means reaches the corresponding time segments.

20. A data input monitor according to claim 19, wherein the LEDs are dual colored.

21. A data input monitor according to claim 14, further comprising initializing means for setting the predefined work period, the predefined rest period, and the predefined input rate.

22. A data input monitor according to claim 14, wherein the memory comprises non-volatile memory; and
the data input monitor further comprising:
a programmable memory coupled to the microprocessor for storing a user defined workpace profile including a predefined work period, a predefined rest period, and a predefined input rate.

23. A data input monitor according to claim 14, wherein the microprocessor including memory and the informing means are incorporated within a structure of a computer keyboard.

24. A data input monitor for use with a computer keyboard and computer, the data input monitor comprising:
a non-volatile memory for storing a predefined work period, a predefined rest period, and a predefined input rate for entering data into the computer during the predefined work period;
a counter for counting a number of keystrokes of the computer keyboard during the predefined work period to provide an actual input rate;
arithmetic logic coupled to the counter and the non-volatile memory to compute an actual rest period by adjusting the predefined rest period in accordance with a relationship between the actual and predefined input rates; and
an indicator, coupled to the arithmetic logic, to inform a user when to work and when to rest.

25. A data input monitor according to claim 24, wherein the indicator comprises at least one of a visual display and an audio emitting device.

26. A data input monitor according to claim 24, wherein the indicator comprises a plurality of light emitting diodes (LEDs) which are illuminated in a selected pattern during the predefined work period and extinguished in a selected pattern during the actual rest period.

27. A data input monitor according to claim 24, wherein the indicator comprises an audio emitting device which emits sound upon termination of the predefined work period to warn a user to begin resting.

28. A data input monitor according to claim 24, wherein the arithmetic logic computes the actual rest period (ARP) as follows:

$$ARP = (AIR/PIR) \times PRP$$

wherein AIR represents the actual input rate, PIR represents the predefined input rate, and PRP represents the predefined rest period.

29. A data input monitor according to claim 24, wherein the predefined work period is apportioned into multiple time segments;
the data input monitor further comprising:
a clock to keep time during the partial time segments of the predefined work period;
and wherein the indicator comprises a plurality of light emitting diodes (LEDs) for corresponding time segments, one LED representing one time segment, the LEDs being illuminated in a selected pattern as the time kept by the clock reaches the corresponding time segments.

30. A data input monitor according to claim 29, wherein the LEDs are dual colored.

31. A data input monitor according to claim 24, wherein the non-volatile memory includes:
read only memory to store multiple workpace profiles, individual workpace profiles including a predefined work period, a predefined rest period, and a predefined input rate; and
programmable read only memory to store a user defined workpace profile including a predefined work period, a predefined rest period, and a predefined input rate.

32. A data input monitor according to claim 24, wherein the non-volatile memory, the counter, the arithmetic logic, and the indicator are incorporated within a structure of a computer keyboard.

33. A computer peripheral unit for use with a computer keyboard and computer, the computer peripheral unit comprising:
a wrist support structure for positioning adjacent to the computer keyboard to prop a users hands at a selected vertical height;
a data input monitor housed in the wrist support structure;
interface means electrically coupled between the keyboard and the computer for transferring to the data input monitor the data entered from the keyboard to the computer;
the data input monitor comprising:
monitoring means for counting a number of keystrokes of the computer keyboard;
determination means for establishing intermittent rest periods in accordance with the number of keystrokes counted; and
means for informing a user to rest during the rest periods.

34. A computer peripheral unit for use with a computer keyboard and computer, the computer peripheral unit comprising:
a wrist support structure for positioning adjacent to the computer keyboard to prop a users hands at a selected vertical height;
a data input monitor housed in the wrist support structure;

interface means electrically coupled between the keyboard and the computer for transferring to the data input monitor the data entered from the keyboard to the computer;

the data input monitor comprising:

memory means for storing a predefined work period, a predefined rest period, and a predefined input rate for entering data into the computer during the predefined work period;

keyboard monitoring means, coupled to receive the data transferred via the interface means, for counting a number of keystrokes of the computer keyboard during the predefined work period;

processing means, operatively coupled to the memory means and the keyboard monitoring means, for computing an actual input rate based upon the number of keystrokes and for deriving an actual rest period by adjusting the predefined rest period in accordance with a relationship between the actual and predefined input rates; and informing means, coupled to the processing means, for indicating to a user to enter data during the predefined work period and to rest during the actual rest period.

35. A computer peripheral unit according to claim 34, wherein the informing means comprises a plurality of light emitting diodes (LEDs) which are illuminated in a selected pattern during the predefined work period and extinguished in a selected pattern during the actual rest period.

36. A computer peripheral unit according to claim 34, wherein the informing means comprises an audio emitting device which emits sound upon termination of the predefined work period to warn a user to begin resting.

37. A computer peripheral unit according to claim 34, further comprising initializing means for setting the predefined work period, the predefined rest period, and the predefined input rate.

38. A computer peripheral unit according to claim 34, wherein the memory means comprises:

a non-volatile memory for permanently storing a plurality of workpace profiles, individual workpace profiles including a predefined work period, a predefined rest period, and a predefined input rate; and a programmable memory for storing a user defined rest period, and a predefined input rate.

39. A computer peripheral unit according to claim 34, wherein the wrist support structure comprises:

a body having upper and lower sides;

at least one padded region provided on the upper side of the body;

at least one adjustable foot operatively mounted to the lower side of the body, the adjustable foot having different selectable vertical settings for vertically raising and lowering the body.

40. A computer peripheral unit according to claim 34, wherein the memory means comprises a programmable storage means which is programmable during a program mode to store a user defined workpace profile including a predefined work period, a predefined rest period, and a predefined input rate; and wherein the interface means includes switch means electrically coupled between the keyboard and the computer and responsive to the processing means, the processing means commanding the switch means to prevent data transmission from the keyboard to the computer during the program mode such that the user can input desired parameters for the user defined workpace profile using the keyboard without affecting computer operation.

41. A computer peripheral unit for use with a computer keyboard and computer, the computer peripheral unit comprising:

a wrist support structure for positioning adjacent to the computer keyboard to prop a users hands at a selected vertical height;

a data input monitor housed in the wrist support structure;

interface means electrically coupled between the keyboard and the computer for transferring to the data input monitor the data entered from the keyboard to the computer;

the data input monitor comprising:

a microprocessor coupled to the interface means and programmed to (1) measure an amount of data entered from the data input device to the computer during a work period, (2) compute intermittent rest periods based upon the measured data amount; and an indicator, coupled to the microprocessor, to inform a user to rest during the rest periods.

42. A computer peripheral unit for use with a computer keyboard and computer, the computer peripheral unit comprising:

a wrist support structure for positioning adjacent to the computer keyboard to prop a users hands at a selected vertical height;

a trackball assembly operably mounted within the wrist support structure for inputting cursor movement information to the computer;

a data input monitor housed in the wrist support structure;

interface means electrically coupled between the keyboard and the computer for transferring to the data input monitor data entered from the keyboard to the computer and for bussing the cursor movement information from the trackball assembly to the computer;

the data input monitor comprising:

monitoring means for counting a number of keystrokes of the computer keyboard;

determination means for establishing intermittent rest periods in accordance with the number of keystrokes counted; and means for informing a user to rest during the rest periods.

43. A method for managing user work pace on a data input device for entering data into a computer, the method comprising the following steps:

measuring an amount of data entered from the data input device into the computer;

providing intermittent rest periods based upon the measured data amount; and informing a user to rest during the rest periods.

44. A method for managing user work pace on a data input device for entering data into a computer, the method comprising the following steps:

setting a predefined work period, a predefined rest period, and a predefined input rate for entering data into the computer during the predefined work period;

measuring an actual input rate that data is entered into the computer;

deriving an actual rest period by adjusting the predefined rest period in accordance with a relationship between the predefined and actual input rates; and informing a user to work during the predefined work period and to rest during the actual rest period.

45. A method according to claim 44, further comprising deriving the actual rest period (ARP) according to the following equation:

$$ARP = (AIR/PIR) \times PRP$$

wherein AIR represents the actual input rate, PIR represents the predefined input rate, and PRP represents the predefined rest period.

46. A method according to claim 44, wherein the informing step comprises:

illuminating a plurality of light emitting diodes (LEDs) in a selected pattern during the predefined work period; and extinguishing the LEDs in a selected pattern during the actual rest period.

47. A method according to claim 44, further comprising emitting an audio alert after termination of the predefined work period to warn a user to begin resting.

48. A method for managing user work pace on a computer keyboard for entering data into a computer, the method comprising the following steps:

setting a predefined work period, a predefined rest period, and a predefined input rate for entering data into the computer during the predefined work period;

counting a number of keystrokes made by a user on the computer keyboard;

computing an actual input rate from the number of keystrokes counted;

deriving an actual rest period by adjusting the predefined rest period in accordance with a relationship between the predefined and actual input rates; and informing a user to work during the predefined work period and to rest during the actual rest period.

49. A method according to claim 48, further comprising deriving the actual rest period (ARP) according to the following equation:

$$ARP = (AIR/PIR) \times PRP$$

wherein AIR represents the actual input rate, PIR represents the predefined input rate, and PRP represents the predefined rest period.

50. A method according to claim 48, wherein the informing step comprises:

illuminating a plurality of light emitting diodes (LEDs) in a selected pattern during the predefined work period; and extinguishing the LEDs in a selected pattern during the actual rest period.

51. A method according to claim 48, further comprising emitting an audio alert after termination of the predefined work period to warn a user to begin resting.

* * * * *